US012619241B2

(12) United States Patent
Shen et al.

(10) Patent No.: US 12,619,241 B2
(45) Date of Patent: May 5, 2026

(54) SYSTEM AND METHOD FOR ZERO-SHOT OBJECT NAVIGATION USING LARGE LANGUAGE MODELS

(71) Applicant: Samsung Electronics Co., Ltd., Suwon-si (KR)

(72) Inventors: Yilin Shen, San Jose, CA (US); Kaiwen Zhou, Santa Cruz, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 18/501,887

(22) Filed: Nov. 3, 2023

(65) Prior Publication Data

US 2024/0377829 A1 Nov. 14, 2024

Related U.S. Application Data

(60) Provisional application No. 63/466,212, filed on May 12, 2023.

(51) Int. Cl.
G05D 1/00 (2024.01)
G06F 40/00 (2020.01)
(Continued)

(52) U.S. Cl.
CPC ......... G05D 1/0274 (2013.01); G05D 1/0251 (2013.01); G06F 40/40 (2020.01); G06T 7/70 (2017.01); G06V 20/50 (2022.01)

(58) Field of Classification Search
CPC ...... G05D 1/0274; G05D 1/0251; G06T 7/70; G06F 40/40; G06V 20/50
(Continued)

(56) References Cited

U.S. PATENT DOCUMENTS

| | | | |
|---|---|---|---|
| 2020/0241574 A1* | 7/2020 | Lin | ..................... G05D 1/0088 |
| 2022/0036153 A1 | 2/2022 | O'Malia et al. | |

(Continued)

FOREIGN PATENT DOCUMENTS

WO 2020069160 A1 4/2020

OTHER PUBLICATIONS

Yuhang Zang, "Contextual Object Detection with Multimodal Large Language Models," Nanyang Technological University, May 29, 2023, whole document. (Year: 2023).*

(Continued)

*Primary Examiner* — Tiffany P Young

(57) ABSTRACT

A method includes determining a specified object to locate within a surrounding environment. The method also includes causing a robot to capture an image and a depth map of the surrounding environment. The method further includes using a scene understanding model, predicting one or more rooms and one or more objects captured in the image. The method also includes updating a second map of the surrounding environment based on the predicted rooms, the predicted objects, the depth map, and a location of the robot. The method further includes determining a likelihood of the specified object being in a candidate room and a likelihood of the specified object being near a candidate object using a pre-trained large language model. The method also includes causing the robot to move to a next location for the robot to search for the specified object, based on the likelihoods and the second map.

20 Claims, 5 Drawing Sheets

(51) Int. Cl.

| | |
|---|---|
| *G06F 40/40* | (2020.01) |
| *G06T 7/00* | (2017.01) |
| *G06T 7/70* | (2017.01) |
| *G06V 20/50* | (2022.01) |

(58) Field of Classification Search

USPC .......................................................... 701/25

See application file for complete search history.

(56) References Cited

U.S. PATENT DOCUMENTS

| | | |
|---|---|---|
| 2022/0404153 A1 | 12/2022 | Meng et al. |
| 2023/0080342 A1 | 3/2023 | Roychoudhury et al. |
| 2023/0101930 A1 | 3/2023 | Ritter et al. |
| 2023/0132280 A1 | 4/2023 | Narayanan et al. |

OTHER PUBLICATIONS

Alejandra Hernandez, "Efficient Object Search Through Probability-Based Viewpoint Selection," 2020 IEEE/RSJ International Conference on Intelligent Robots and Systems, Oct. 25-29, 2020, whole article. (Year: 2020).*

Menon, S., et al., "Visual Classification Via Description from Large Language Models", arXiv:2210.07183v2 [cs.CV] Dec. 1, 2022, 17 pages.

Majumdar, A., et al., "ZSON: Zero-Shot Object-Goal Navigation using Multimodal Goal Embeddings", 36th Conference on Neural Information Processing Systems (NeurIPS 2022), Oct. 31, 2022, 13 pages.

Gadre, S., et al., "CLIP on Wheels: Zero-Shot Object Navigation as Object Localization and Exploration", arXiv:2203.10421v1 [cs.CV], Mar. 20, 2022, 22 pages.

Zhou, K., et al., "ESC: Exploration with Soft Commonsense Constraints for Zero-shot Object Navigation", arXiv:2301.13166v1 [cs.AI], Jan. 30, 2023, 14 pages.

International Search Report and Written Opinion of the International Searching Authority dated PCT/KR2024/003438, in connection with International Application No. Jun. 21, 2024, 7 pages.

Gadre et al., "CoWs on PASTURE: Baselines and Benchmarks for Language-Driven Zero-Shot Object Navigation," Dec. 14, 2022, 21 pages.

Shah et al., "LM-Nav: Robotic Navigation with Large Pre-Trained Models of Language, Vision, and Action," Jul. 26, 2022, 18 pages.

Huang et al., "Visual Language Maps for Robot Navigation," Mar. 8, 2023, 11 pages.

Supplementary European Search Report dated Mar. 12, 2026, in connection with European Patent Application No. 2487335.5, 10 pages.

Dorbala et al., "Can an Embodied Agent Find Your "Cat-shaped Mug" LLM-Based Zero-Shot Object Navigation," Mar. 2023, 8 pages.

Yu et al., "L3MVN: Leveraging Large Language Models for Visual Target Navigation," Apr. 2023, 7 pages.

* cited by examiner

400

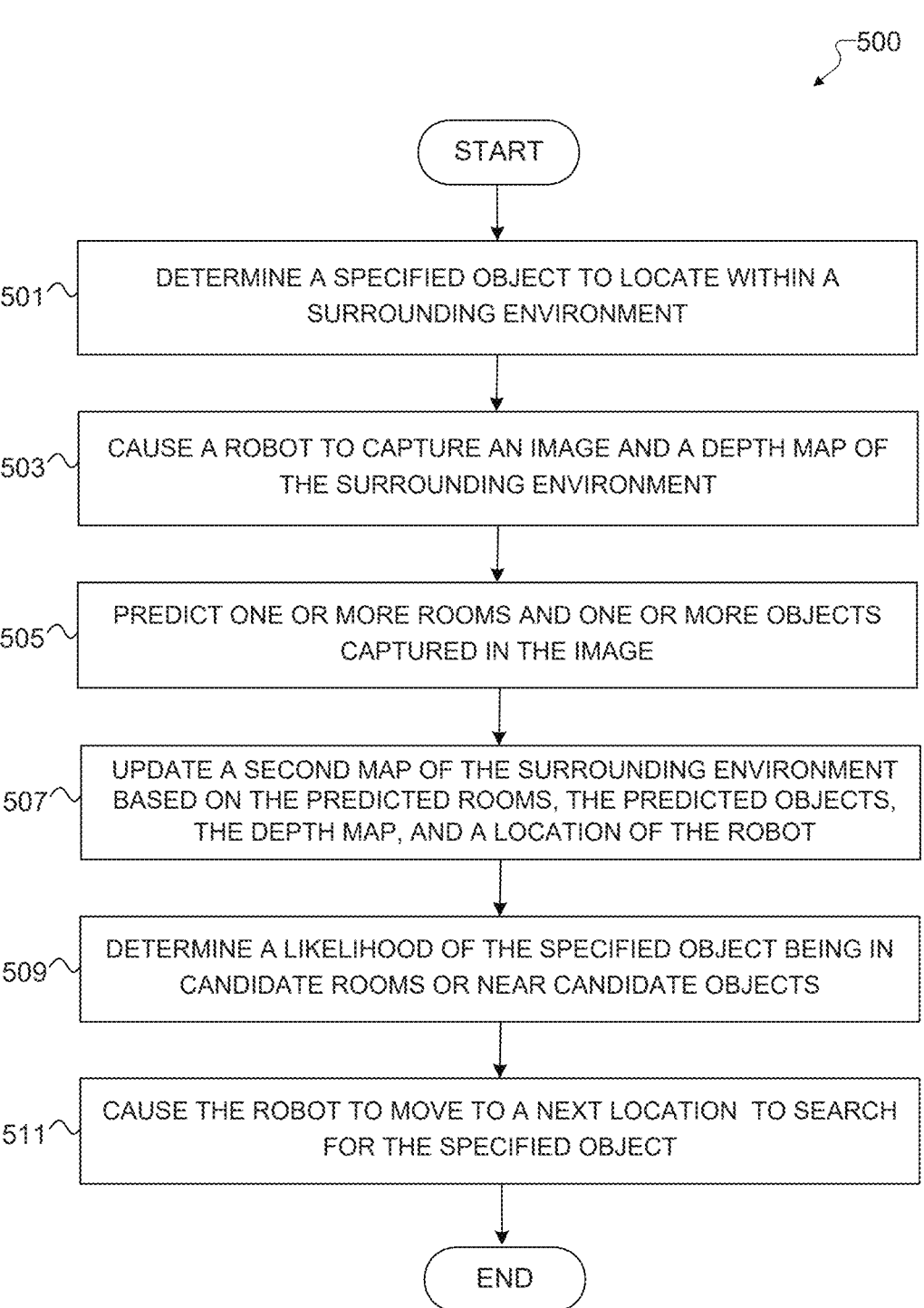

500

START

501 — DETERMINE A SPECIFIED OBJECT TO LOCATE WITHIN A SURROUNDING ENVIRONMENT

503 — CAUSE A ROBOT TO CAPTURE AN IMAGE AND A DEPTH MAP OF THE SURROUNDING ENVIRONMENT

505 — PREDICT ONE OR MORE ROOMS AND ONE OR MORE OBJECTS CAPTURED IN THE IMAGE

507 — UPDATE A SECOND MAP OF THE SURROUNDING ENVIRONMENT BASED ON THE PREDICTED ROOMS, THE PREDICTED OBJECTS, THE DEPTH MAP, AND A LOCATION OF THE ROBOT

509 — DETERMINE A LIKELIHOOD OF THE SPECIFIED OBJECT BEING IN CANDIDATE ROOMS OR NEAR CANDIDATE OBJECTS

511 — CAUSE THE ROBOT TO MOVE TO A NEXT LOCATION TO SEARCH FOR THE SPECIFIED OBJECT

END

FIG. 5

SYSTEM AND METHOD FOR ZERO-SHOT OBJECT NAVIGATION USING LARGE LANGUAGE MODELS

CROSS-REFERENCE TO RELATED APPLICATION AND PRIORITY CLAIM

This application claims priority under 35 U.S.C. § 119(e) to U.S. Provisional Patent Application No. 63/466,212 filed on May 12, 2023, which is hereby incorporated by reference in its entirety.

TECHNICAL FIELD

This disclosure relates generally to object navigation. More specifically, this disclosure relates to a system and method for zero-shot object navigation using large language models.

BACKGROUND

Object navigation is a task in which an embodied agent must navigate to a specific goal object within an unknown environment. This task can be fundamental to other navigation-based embodied tasks because it enables the agent to interact with the goal object. Such object navigation tasks usually require large-scale training in visual environments with labeled objects.

SUMMARY

This disclosure provides a system and method for zero-shot object navigation using large language models.

In a first embodiment, a method includes determining a specified object to locate within a surrounding environment, the surrounding environment comprising multiple candidate rooms and multiple candidate objects. The method also includes causing a robot to capture an image and a depth map of the surrounding environment. The method further includes using a scene understanding model, predicting one or more rooms and one or more objects captured in the image. The method also includes updating a second map of the surrounding environment based on the one or more predicted rooms, the one or more predicted objects, the depth map, and a location of the robot. The method further includes determining a likelihood of the specified object being in each of the candidate rooms and a likelihood of the specified object being near each of the candidate objects using a pre-trained large language model. In addition, the method includes causing the robot to move to a next location for the robot to search for the specified object, based on the determined likelihoods and the second map of the surrounding environment.

In a second embodiment, an electronic device includes at least one processing device configured to determine a specified object to locate within a surrounding environment, the surrounding environment comprising multiple candidate rooms and multiple candidate objects. The at least one processing device is also configured to cause a robot to capture an image and a depth map of the surrounding environment. The at least one processing device is further configured to using a scene understanding model, predict one or more rooms and one or more objects captured in the image. The at least one processing device is also configured to update a second map of the surrounding environment based on the one or more predicted rooms, the one or more predicted objects, the depth map, and a location of the robot.

The at least one processing device is further configured to determine a likelihood of the specified object being in each of the candidate rooms and a likelihood of the specified object being near each of the candidate objects using a pre-trained large language model. In addition, the at least one processing device is configured to cause the robot to move to a next location for the robot to search for the specified object, based on the determined likelihoods and the second map of the surrounding environment.

In a third embodiment, a non-transitory machine-readable medium contains instructions that when executed cause at least one processor of an electronic device to determine a specified object to locate within a surrounding environment, the surrounding environment comprising multiple candidate rooms and multiple candidate objects. The non-transitory machine-readable medium also contains instructions that when executed cause the at least one processor to cause a robot to capture an image and a depth map of the surrounding environment. The non-transitory machine-readable medium further contains instructions that when executed cause the at least one processor to using a scene understanding model, predict one or more rooms and one or more objects captured in the image. The non-transitory machine-readable medium also contains instructions that when executed cause the at least one processor to update a second map of the surrounding environment based on the one or more predicted rooms, the one or more predicted objects, the depth map, and a location of the robot. The non-transitory machine-readable medium further contains instructions that when executed cause the at least one processor to determine a likelihood of the specified object being in each of the candidate rooms and a likelihood of the specified object being near each of the candidate objects using a pre-trained large language model. In addition, the non-transitory machine-readable medium contains instructions that when executed cause the at least one processor to cause the robot to move to a next location for the robot to search for the specified object, based on the determined likelihoods and the second map of the surrounding environment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 5 illustrates an example method for zero-shot object navigation using large language models according to this disclosure.

DETAILED DESCRIPTION

Figure 1:
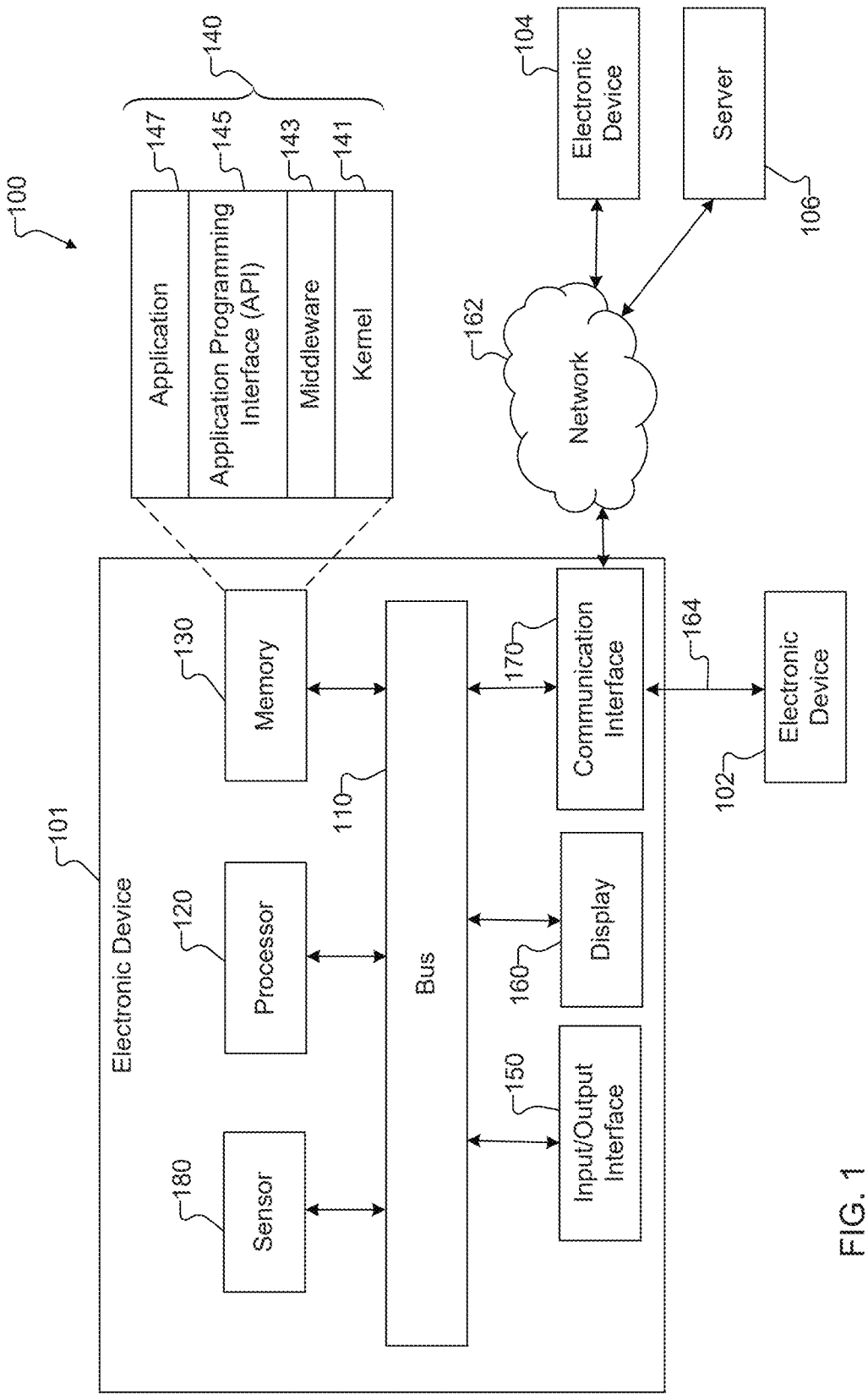
FIG. 1 illustrates an example network configuration including an electronic device according to this disclosure.

FIGS. 1 through 5, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, object navigation is a task in which an embodied agent must navigate to a specific goal object within an unknown environment. This task can be fundamental to other navigation-based embodied tasks because it enables the agent to interact with the goal object. Such object navigation tasks usually require large-scale training in visual environments with labeled objects.

While conventional techniques for object navigation achieve good results when trained on specific datasets with limited goal objects and similar environments, they may perform poorly when faced with novel objects or environments due to distribution shifts. Real-world situations often involve diverse objects and varied environments, making it difficult and costly to collect extensive, annotated trajectory data. As a result, generalized zero-shot object navigation, in which the navigation agent can adapt to novel objects and environments without additional training, is a crucial area of study.

To successfully navigate to a goal object, the agent should possess both semantic scene understanding and commonsense reasoning abilities. Semantic scene understanding involves identifying objects present in the environment, while commonsense reasoning involves making logical inferences about the location of the goal object according to the scene understanding. However, current zero-shot (i.e., unseen) object navigation methods have not effectively addressed this requirement and often lack commonsense reasoning abilities. In addition, some methods still require training on other goal-oriented navigation tasks and environments.

In some techniques, knowledge in pre-trained models for semantic scene understanding and commonsense reasoning can be transferred to open-world object navigation without any navigation experience nor any other training on the visual environments to achieve training-free zero-shot object navigation. However, these large pre-trained models may not directly generate navigation actions well. Thus, it would be advantageous to mitigate the gap between pre-trained knowledge and navigation actions.

This disclosure provides various techniques for zero-shot object navigation using large language models (LLMs). As described in more detail below, the disclosed systems and methods provide a zero-shot object navigation framework that incorporates commonsense knowledge into an exploration method, frontier-based exploration (FBE), using Probabilistic Soft Logic (PSL). PSL is a declarative templating language that defines a special class of Markov random fields using first order logical rules. PSL provides a simple framework to incorporate commonsense knowledge from LLMs into exploration in a zero-shot manner. Unlike conventional techniques that rely on implicit training of commonsense using neural networks, the disclosed embodiments use soft logic predicates to represent knowledge in a continuous value space, which is then assigned to each frontier, enabling more effective exploration. In particular, the framework leverages pre-trained models and can seamlessly generalize to unseen environments and novel object types. Then, the framework utilizes a pre-trained commonsense reasoning language model that takes the room and object information as context to infer the correspondence between the rooms and objects.

Note that while some of the embodiments discussed below are described in the context of use in consumer electronic devices (such as home robots), this is merely one example, and it will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for zero-shot object navigation using large language models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for zero-shot object navigation using large language models as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for zero-shot object navigation using large language models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
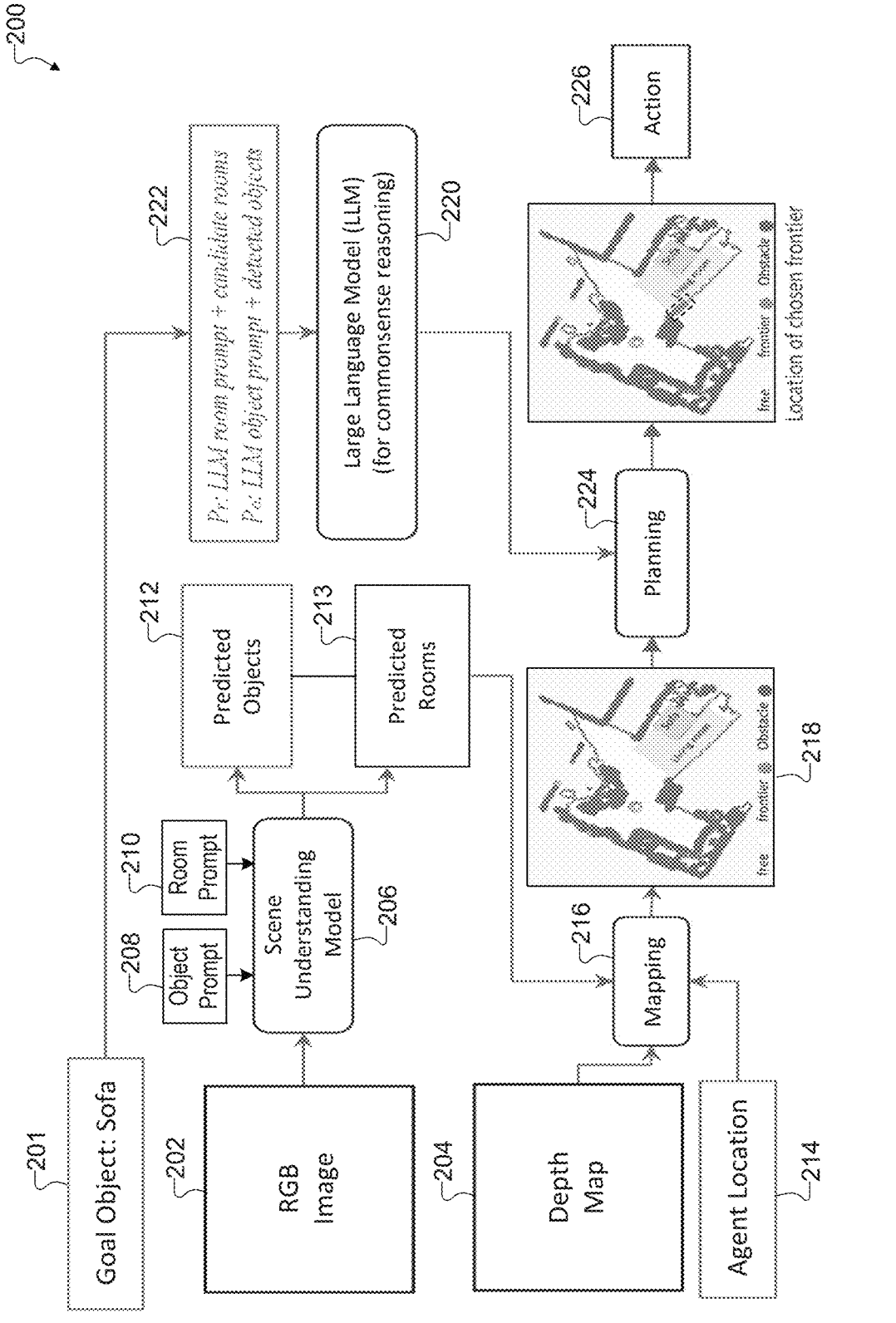
FIG. 2 illustrates an example framework for zero-shot object navigation using large language models according to this disclosure.

FIG. 2 illustrates an example framework 200 for zero-shot object navigation using large language models according to this disclosure. For ease of explanation, the framework 200 is described as being implemented using one or more components of the network configuration 100 of FIG. 1 described above, such as the electronic device 101. However, this is merely one example, and the framework 200 could be implemented using any other suitable device(s) (such as the server 106) and in any other suitable system(s).

As described in greater detail below, the electronic device 101 uses the framework 200 to perform semantic scene understanding and commonsense reasoning via one or more large pre-trained models in a zero-shot manner. The electronic device 101 also combines frontier based exploration techniques with commonsense reasoning via PSL. To promote understanding of the framework 200, it may be helpful to further describe zero-shot object navigation and PSL as used in conjunction with the framework 200.

Zero-Shot Object Navigation

Figure 3:
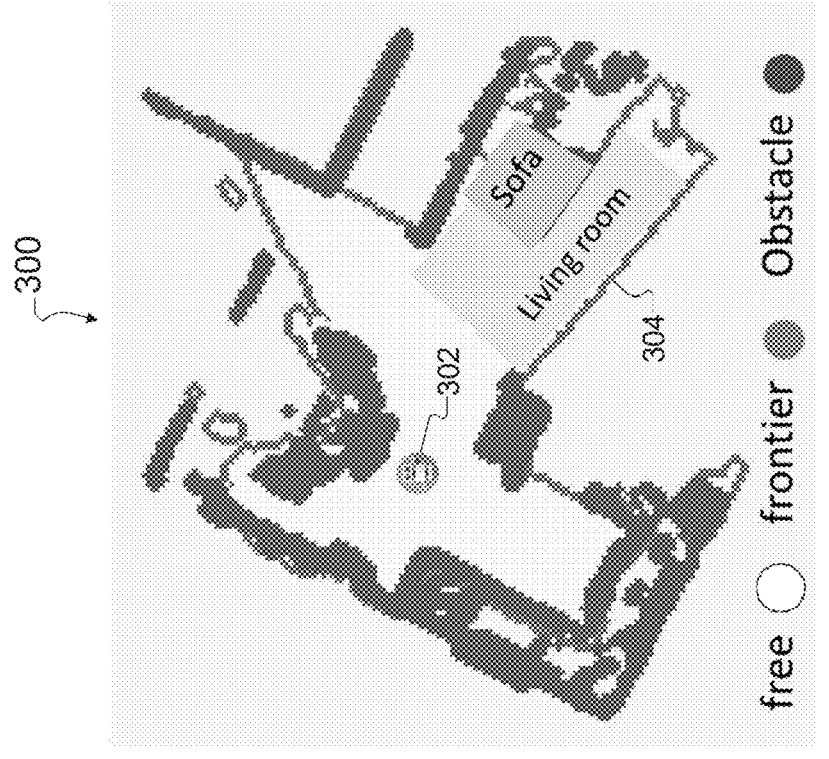
FIG. 3 illustrates an example environment in which an agent performs object navigation according to this disclosure.
Figure 4:
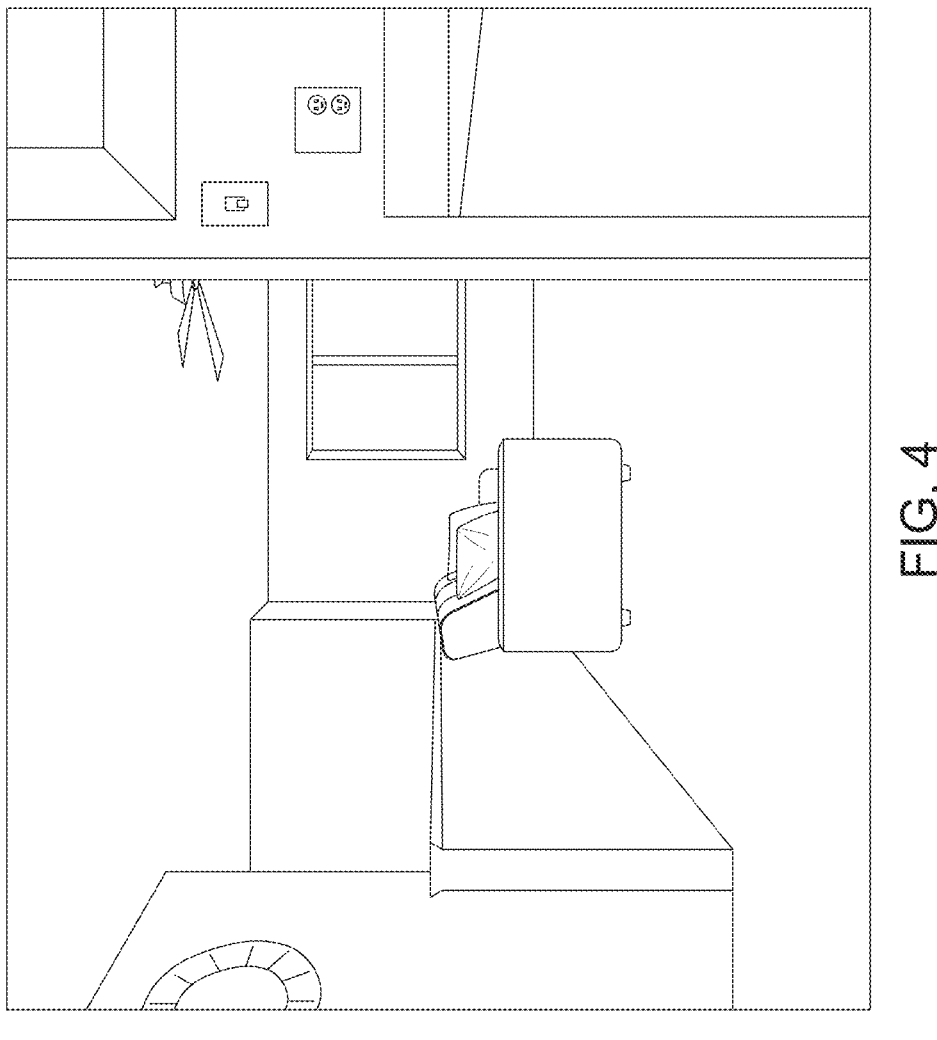
FIG. 4 illustrates an example image captured by the agent during object navigation according to this disclosure.
Figure 4:

In an object navigation task, an agent may be placed randomly in an unseen environment. FIG. 3 illustrates an example environment 300 in which an agent 302 performs object navigation according to this disclosure. Here, the agent 302 is a robot, although the agent could be another electronic device capable of exploring an environment. The agent 302 is given a goal object category (e.g., chair, fireplace, cabinet, etc.), and the objective is to navigate to any object instance that belongs to the category. At each step t, the agent 302 has an observation including an image and sometimes pose readings. FIG. 4 illustrates an example image 400 captured by the agent 302 during object navigation according to this disclosure. Based on the observation (including the image 400), the agent 302 can choose an action in the action space, which can include a 'STOP' action to terminate the navigation process. The navigation is considered successful if the agent 302 stops within a threshold distance of the goal object and the object is visible without further moving.

As noted earlier, navigation learning in the real world is not practical with its high cost, and most current methods are hard to generalize to new environments and new objects. Thus, the zero-shot navigation used in the framework 200 includes three levels. The first level is task-level, in which the agent 302 can perform object goal navigation without object goal navigation training. The second level is environment-level, which means, for a new set of environments, the model allows the agent 302 to perform object navigation in the set of environments without training on any data from the environments. The third level is object-level, where the model can generalize to new goal objects without further training.

The framework 200 uses principles of frontier-based exploration, which is a heuristic exploration method and can be adapted to object navigation. As shown in FIG. 3, a frontier 304 in the environment 300 is defined as a border between a free area and an unseen area. A free area is defined as an area that the agent 302 has seen and is not occupied by an obstacle. Using frontier based exploration, the agent 302 can choose the closest frontier 304 (with a distance threshold $d_f$) as the next sub-goal after it reaches a frontier 304. The agent can directly navigate to the goal object after it detects one. For example, as in FIG. 3, after detecting a living room in the environment 300, the agent 302 may prefer to explore the unseen area in the living room to find a television or sofa.

Probabilistic Soft Logic

PSL is a probabilistic programming language that defines hinge-loss Markov random fields (HL-MRF) using a syntax based on first-order logic. Specifically, PSL models relational dependencies using weighted first-order logical clauses, referred to as rules. For example, for the relation dependency between a frontier near an object and choosing this frontier as a sub-goal, the following rule can be established.

$$w : \text{IsCooccur(Goal, Object)}$$
$$\wedge \text{IsNearObj(Frontier, Object)} \quad (1)$$
$$\rightarrow \text{ChooseFrontier(Frontier)}$$

In this rule, the predicate IsCooccur measures the relation between the target object and one of the other objects, IsNearObj measures whether a frontier is near an object, ChooseFrontier (Frontier) is the soft value of choosing a frontier, and w measures the relative importance of this rule in the model.

During PSL inference, observed variables X, IsCooccur, and IsNearObj can be replaced with actual entities and values. This process is referred to as grounding, and each concrete instance of a rule is referred to as a ground rule. PSL defines a hinge-loss potential function for each grounded rule over unobserved variable Y=ChooseFrontier (Frontier), such as by the following.

$$\phi(Y, X) = [\max(0, l(Y, X))]^p \tag{2}$$

Here, l is a linear penalty function defined by PSL. $\phi(Y,X)$ represents the distance to satisfaction of this ground rule. The value of the predicates X, Y are in the range [0,1], and $p \in \{1,2\}$ optionally squares the potentials.

Given all the observed variables X and unobserved variables Y, PSL defines a HL-MRF over the unobserved variables, which can be represented as follows.

$$P(Y \mid X) = \frac{1}{Z(Y)}\exp\left(-\sum_{i=1}^{m} w_i\phi_i(Y, X)\right) \tag{3}$$

$$Z(Y) = \int_Y \exp\left(-\sum_{i=1}^{m} w_i\phi_i(Y, X)\right) \tag{4}$$

Here, m denotes the number of potential functions, $\phi_i$ is the ith potential function, $w_i$ is the weight of the template rule for $\phi_i$.

The purpose of PSL inference is to find the value of Y with the lowest penalty (i.e., find the frontier scores obeying the commonsense the best). Here, the optimization for the distribution can be converted to a convex optimization problem, which can be represented as follows.

$$Y^* = \mathop{\text{argmin}}_{Y} \sum_{i=1}^{m} w_i\phi(Y, X) \tag{5}$$

As shown in FIG. 2, the electronic device 101 uses the framework 200 to cause the agent 302 to locate a goal object 201, which is a specified object among multiple candidate objects and candidate rooms within the environment 300 surrounding the agent 302. In this example, the goal object 201 can be a sofa. In some embodiments, the goal object 201 can be determined based on receiving a request (e.g., a request from a user) to locate the goal object 201 within the environment 300. Once the goal object 201 is determined, the electronic device 101 obtains at least one RGB image 202 and at least one depth map 204 of the environment 300. The RGB image 202 can represent (or be represented by) the image 400 of FIG. 4. The RGB image 202 and the depth map 204 can be captured by the agent 302 while the agent 302 is within (or nearby) the environment 300. In some embodiments, the electronic device 101 can represent the agent 302 or portions thereof. In other embodiments, the electronic device 101 can represent a different device than the agent 302. In some embodiments, the electronic device 101 can cause the agent 302 to capture the RGB image 202 and the depth map 204, such as by providing an instruction to the agent 302.

Scene Understanding

To leverage large language models for navigation inference, the RGB image 202 is transformed into semantic context in language form. To achieve this, the electronic device 101 uses a scene understanding model 206 with a text prompt. In some embodiments, the scene understanding model 206 is a pre-trained, prompt-based grounded language-image model, such as GLIP. Different from conventional object detection models and semantic segmentation models (such as Mask-RCNN), which are limited with fixed classes, the scene understanding model 206 formulates the detection task as a grounding problem by aligning the proposed image region with phrases in the text prompt, and predicting the score of region-text alignment. Benefiting from large-scale image-text training, the scene understanding model 206 can detect normal indoor concepts in an open-world setting. Thus, it is easy to generalize to different datasets with different environments and goal objects to perform open-world object navigation.

The electronic device 101 defines a set of common indoor objects $\mathcal{O}_c$, and then uses the union of the common objects and all the possible goal objects $\mathcal{O}_g$ to generate an object prompt $P_o$ 208 for object grounding. In some embodiments, the object prompt $P_o$ 208 includes the object names joined by a period ('.'). For example, if $\mathcal{O}_c$={cabinet,table} and $\mathcal{O}_g$={chair,table}, then the object prompt 208 would be 'cabinet. chair. table.'.

Object information in the current scene is a relatively low-level scene context. When humans are searching for a goal object in an unseen environment, they will usually consider higher-level contexts (e.g., "Which room should I go to?"). Thus, a set of common rooms $\mathcal{R}_c$ is defined in indoor environments for a room prompt $P_r$ 210 in order to detect room information. The electronic device 101 inputs the object prompt 208, the room prompt 210, and the RGB image 202 into the scene understanding model 206, which can determine one or more predicted objects 212 and one or more predicted rooms 213, along with bounding boxes from the current scene, such as by the following equations.

$$\{o_{t,i}, b_{t,i}^o\} = GLIP(I_t, P_o) \tag{6}$$

$$\{r_{t,i}, b_{t,i}^r\} = GLIP(I_t, P_r) \tag{7}$$

Here, $$b_{t,i}^o$$

and $$b_{t,i}^r$$

are the bounding boxes of the predicted objects 212 and predicted rooms 213. These prompts can be easily extended to generalize to new test data to perform open-world semantic scene understanding.

Map Construction

The electronic device 101 uses the depth map 204, agent location 214 (which can include agent pose information), and camera parameters as inputs to a mapping operation 216, such as a simultaneous localization and mapping (SLAM) algorithm. The mapping operation 216 transforms the pixels of the 2D RGB image 202 into 3D space, which is stored in a 3D voxel. The mapping operation 216 also projects the 3D voxel along the height dimension and 2D obstacle map, which is maintained during navigation. Furthermore, the mapping operation 216 projects the detected room and object location into a semantic map 218. For object detection, the center of a bounding box is projected to a 2D location. For room detection, all the pixels in a bounding box are projected into a 2D map and the projected location is recorded as the corresponding room.

Commonsense Reasoning

It is intuitive that the goal object 201 should appear in certain rooms and near certain objects more frequently. For example, on average, a sofa will appear in a living room near a television more frequently than in a kitchen near a refrigerator. This kind of commonsense is helpful for the agent 302 to search for the goal object 201. Accordingly, after detecting the room and object information in the current scene, the electronic device 101 can use a pre-trained large language model 220 to perform commonsense reasoning conditioned on the goal object 201 and semantic scene information via a text prompt 222. Here, the large language model 220 can represent a publicly available large language model or any other suitable large language model. The text prompt 222 is an input to the large language model 220 and can include the goal object 201 and one or more of the candidate rooms and candidate objects in the environment 300.

Specifically, for object-level and room-level inference, the large language model 220 can reason on whether the goal object 201—represented as G—is likely to be near each candidate object $o_i$ in the object prompt 208, and whether the goal object 201 is likely to be in each room $r_i$ in the room prompt 210. The prediction output from the large language model 220 can be the scores $S(G|o_i)$, $S(G|r_i) \in [0, 1]$ of each (goal, object) pair and (goal, room) pair. For example, one text prompt 222 could be "What is a sofa likely to be near? Candidates: television, table, bed, counter, . . . " The prediction output from the large language model 220 can be a set of likelihood scores $\{0.6, 0.3, 0.4, 0.1, \dots\}$, where each of the likelihood scores corresponds to one of the candidate objects. As another example, one text prompt 222 could be "Please provide scores representing the likelihood to find a sofa in the following rooms. Candidates: bedroom, kitchen, . . . " The prediction output from the large language model 220 can be the set of likelihood scores $\{0.6, 0.1, \dots\}$, where each of the likelihood scores corresponds to one of the candidate rooms. Techniques for obtaining the likelihood scores from the large language model 220 and the syntax for the text prompt 222 can vary between different LLMs.

Commonsense Guided Frontier Exploration

In object goal navigation, exploring the environment efficiently can be very important to find the target object, as the object may not be seen in the agent's initial location. Traditional frontier based exploration could be used to explore the environment. However, choosing the closest frontier as a sub-goal to explore may not be optimum in semantic-rich environments and may be against commonsense. For example, an agent might check the frontiers behind the couch in a living room to search a bed. Thus, the framework 200 includes commonsense knowledge along with frontier based exploration techniques. The goal is to make the frontier selection decision P(F) based on not only the distances $d_i$ from the agent 302, but also the object $o^r$ and room level information $r^r$ around the frontiers 304 in the environment 300, such as by the following.

$$P(F) = P(F \mid d_i, o^r, r^r) \qquad (8)$$

Intuitively, a frontier 304 is more likely to be chosen if it is close to an object near which the goal object 201 is likely to appear, and if the frontier 304 is near or in a room in which the goal object 201 is more likely to appear, and vice versa. However, these rules are not absolutely right or wrong. All of the frontiers 304 that satisfy different numbers of rules can be compared. Also, the conditions in these rules are not absolutely true or false either. For example, the goal object 201 can be somewhat likely or very likely to appear near an object.

Accordingly, the electronic device 101 performs a planning operation 224, in which the electronic device 101 combines commonsense reasoning with frontier based exploration via PSL. In the planning operation 224, the electronic device 101 can perform object reasoning, room reasoning, or both, to select a frontier 304 among the frontiers 304 identified in the semantic map 218. These will now be described.

Object Reasoning

After the electronic device 101 detects the objects and the frontiers 304 in the semantic map 218, the electronic device 101 may select those frontiers 304 according to whether a frontier 304 is close to an object and whether this object is likely to appear around the goal object 201. The selection may be based on the following PSL rule:

$$w : \text{IsCooccur(Goal, Object)}$$
$$\text{^ IsNearObj(Frontier, Object)} \quad (9)$$
$$\rightarrow \text{ChooseFrontier(Frontier)}$$

This rule encourages the agent 302 to explore those frontiers 304 near some objects that are likely to appear around the goal object 201 (i.e., explore near an object if the likelihood of the object being near the goal object 201 is greater than a predetermined threshold). The value of IsCooccur (Goal, Object) is the co-occurrence score $S(G|o_i)$ for the (Goal, Object) pair predicted by the large language model 220, and the value of IsNearObj (Frontier, Object) is the confidence of the object prediction by the scene understanding model 206 if the object is within $d_o$ meters of the frontier 304 according to the semantic map 218; otherwise IsNearObj (Frontier, Object)=0.

Furthermore, to discourage the agent 302 from exploring those frontiers 304 near some objects that are not likely to be around the goal object 201 (i.e., discourage the agent 302 from exploring near an object if the likelihood of the object being near the goal object 201 is less than the predetermined threshold), a corresponding negative PSL rule can be used, such as the following.

$$w : \text{!IsCooccur(Goal, Object)}$$
$$\text{^ IsNearObj(Frontier, Object)} \quad (10)$$
$$\rightarrow \text{!ChooseFrontier(Frontier)}$$

Room Reasoning

Similar to object reasoning, room reasoning encourages the agent 302 to explore the frontiers 304 that are near or in a room where the goal object 201 is likely to appear, and vice versa. Thus, room reasoning can include two rules—one positive and one negative—such as the following.

$$w : \text{IsCooccur(Goal, Room)}$$
$$\char94 \text{ IsNearRoom(Frontier, Room)} \quad (11)$$
$$\rightarrow \text{ChooseFrontier(Frontier)}$$
$$w : \text{!IsCooccur(Goal, Room)}$$
$$\char94 \text{ IsNearRoom(Frontier, Room)} \quad (12)$$
$$\rightarrow \text{!ChooseFrontier(Frontier)}$$

It can be seen that Eq. (11) and Eq. (12) are similar to Eq. (9) and Eq. (10), but the 'Obj' and 'Object' terms are replaced with 'Room'.

Closest Frontiers

As described above, traditional frontier-based exploration techniques choose the frontier with the shortest distance (above a threshold) from an agent. This can encourage an agent to continue explore one area until there is nothing to explore. Similarly, the planning operation 224 can include a shortest distance rule to encourage the agent 302 to explore the nearby frontiers 304. One example shortest distance rule is the following.

$$w : \text{ShortDist(Frontier)}$$
$$\rightarrow \text{ChooseFrontier(Frontier)} \quad (13)$$

In some embodiments, a PSL hard constraint can be implemented to limit the sum of the scores of choosing all the frontiers to one, such as by the following.

$$ChooseFrontier(+\text{Frontier}) = 1 \quad (14)$$

This constraint prevents the degenerated solution where all the unobserved variables are equal to one, and encourages the frontiers to compete with each other. The same weights may be used for all the rules in the PSL model.

Once the electronic device 101 has chosen a frontier 304 for the agent 302 to explore, the electronic device 101 instructs the agent 302 to perform an action 226, such as causing the agent 302 to move to the location of the chosen frontier 304.

Although FIGS. 2 through 4 illustrate one example of a framework 200 for zero-shot object navigation using large language models and related details, various changes may be made to FIGS. 2 through 4. For example, while the framework 200 is described as involving specific sequences of operations, various operations described with respect to FIG. 2 could overlap, occur in parallel, occur in a different order, or occur any number of times (including zero times). Also, the specific operations shown in FIG. 2 are examples only, and other techniques could be used to perform each of the operations shown in FIG. 2.

Note that the operations and functions shown in or described with respect to FIGS. 2 through 4 can be implemented in an electronic device 101, 102, 104, server 106, or other device(s) in any suitable manner. For example, in some embodiments, the operations and functions shown in or described with respect to FIGS. 2 through 4 can be implemented or supported using one or more software applications or other software instructions that are executed by the processor 120 of the electronic device 101, 102, 104, server 106, or other device(s). In other embodiments, at least some of the operations and functions shown in or described with respect to FIGS. 2 through 4 can be implemented or supported using dedicated hardware components. In general, the operations and functions shown in or described with respect to FIGS. 2 through 4 can be performed using any suitable hardware or any suitable combination of hardware and software/firmware instructions. Also, the functions shown in or described with respect to FIGS. 2 through 4 can be performed by a single device or by multiple devices.

FIG. 5 illustrates an example method 500 for zero-shot object navigation using large language models according to this disclosure. For ease of explanation, the method 500 shown in FIG. 5 is described as being performed using the electronic device 101 shown in FIG. 1 using the framework 200 shown in FIG. 2. However, the method 500 shown in FIG. 5 could be used with any other suitable device(s) or system(s).

As shown in FIG. 5, at step 501, a specified object to locate within a surrounding environment is determined. The surrounding environment includes multiple candidate rooms and multiple candidate objects. This could include, for example, the electronic device 101 determining the goal object 201 to locate within the environment 300.

At step 503, a robot captures an image and a depth map of the surrounding environment. This could include, for example, the electronic device 101 causing the agent 302 to capture a RGB image 202 and a depth map 204 of the surrounding environment 300.

At step 505, one or more rooms and one or more objects captured in the image are predicted using a scene understanding model. This could include, for example, the electronic device 101 using the scene understanding model 206 to determine one or more predicted rooms 213 and one or more predicted objects 212.

At step 507, a second map of the surrounding environment is updated based on the one or more predicted rooms, the one or more predicted objects, the depth map, and a location of the robot. This could include, for example, the electronic device 101 performing the mapping operation 216 to update a semantic map 218 of the environment 300 based on the one or more predicted rooms 213, the one or more predicted objects 212, the depth map 204, and the agent location 214.

At step 509, a pre-trained large language model is used to determine a likelihood of the specified object being in each of the candidate rooms and a likelihood of the specified object being near each of the candidate objects. This could include, for example, the electronic device 101 using the large language model 220 to determine a likelihood of the goal object 201 being in each of the candidate rooms and a likelihood of the specified object being near each of the candidate objects.

At step 511, the robot moves to a next location for the robot to search for the specified object, based on the determined likelihoods and the second map of the surrounding environment. This could include, for example, the electronic device 101 causing the agent 302 to move to a next location for the agent 302 to search for the goal object 201, based on the likelihoods determined from the large language model 220 and the semantic map 218.

Although FIG. 5 illustrates one example of a method 500 for zero-shot object navigation using large language models, various changes may be made to FIG. 5. For example, while shown as a series of steps, various steps in FIG. 5 could overlap, occur in parallel, occur in a different order, or occur any number of times (including zero times).

As discussed above, the disclosed embodiments introduce commonsense reasoning of large language models into object navigation task and feature a framework that leverages pre-trained vision and language models for reasoning based on open-world object-level and room-level scene context in a zero-shot manner. The disclosed embodiments also feature an exploration system that seamlessly combines zero-shot commonsense reasoning with traditional exploration methods using Probabilistic Soft Logic (PSL), which is training-free and interpretable. The disclosed embodiments achieve improved results on zero-shot object goal navigation and outperform conventional techniques by a large margin across various object navigation datasets and benchmarks.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

determining a specified object to locate within a surrounding environment, the surrounding environment comprising multiple candidate rooms and multiple candidate objects;

causing a robot to capture an image and a depth map of the surrounding environment;

using a scene understanding model, predicting one or more rooms and one or more objects captured in the image;

updating a semantic map of the surrounding environment based on the one or more predicted rooms, the one or more predicted objects, the depth map, and a location of the robot;

determining a likelihood of the specified object being in each of the candidate rooms and a likelihood of the specified object being within a threshold distance of each of the candidate objects using a pre-trained large language model, wherein the pre-trained large language model receives as an input a natural language query comprising the specified object and each of the candidate rooms to the pre-trained large language model, and wherein the pre-trained large language model provides the determined likelihoods based on known associations between the specified object, the candidate rooms, and the candidate objects; and causing the robot to move to a next location for the robot to search for the specified object, based on the determined likelihoods and the semantic map of the surrounding environment.

2. The method of claim 1, wherein determining the specified object to locate within the surrounding environment comprises receiving a request from a user to locate the specified object within the surrounding environment.

3. The method of claim 1, wherein determining the likelihood of the specified object being in each of the candidate rooms and the likelihood of the specified object being within the threshold distance of each of the candidate objects using the pre-trained large language model comprises:

inputting the natural language query comprising the specified object and each of the candidate rooms to the pre-trained large language model; and obtaining a response from the pre-trained large language model, the response comprising a likelihood score for each of the candidate rooms.

4. The method of claim 1, wherein causing the robot to move to the next location based on the determined likelihoods and the semantic map of the surrounding environment comprises using a probabilistic soft logic algorithm and one or more of the determined likelihoods to select a frontier among multiple frontiers identified in the semantic map.

5. The method of claim 1, wherein causing the robot to move to the next location comprises causing the robot to move to an unexplored location within a threshold distance of a first predicted object of the one or more predicted objects if the likelihood of the first predicted object being within the threshold distance of the specified object is greater than a threshold.

6. The method of claim 5, wherein causing the robot to move to the next location further comprises causing the robot to not move to the unexplored location within the threshold distance of the first predicted object if the likelihood of the first predicted object being within the threshold distance of the specified object is less than the threshold.

7. The method of claim 1, wherein causing the robot to move to the next location comprises causing the robot to move to an unexplored location in or within a threshold distance of a first predicted room of the one or more predicted rooms if the likelihood of the specified object being in or within the threshold distance of the first predicted room is greater than a threshold.

8. An electronic device comprising:

at least one processor configured to:

determine a specified object to locate within a surrounding environment, the surrounding environment comprising multiple candidate rooms and multiple candidate objects;

cause a robot to capture an image and a depth map of the surrounding environment;

using a scene understanding model, predict one or more rooms and one or more objects captured in the image;

update a semantic map of the surrounding environment based on the one or more predicted rooms, the one or more predicted objects, the depth map, and a location of the robot;

determine a likelihood of the specified object being in each of the candidate rooms and a likelihood of the specified object being within a threshold distance of each of the candidate objects using a pre-trained large language model, wherein the pre-trained large language model receives as an input a natural language query comprising the specified object and each of the candidate rooms to the pre-trained large language model, and wherein the pre-trained large language model provides the determined likelihoods based on known associations between the specified object, the candidate rooms, and the candidate objects; and cause the robot to move to a next location for the robot to search for the specified object, based on the determined likelihoods and the semantic map of the surrounding environment.

9. The electronic device of claim 8, wherein to determine the specified object to locate within the surrounding environment, the at least one processor is configured to receive a request from a user to locate the specified object within the surrounding environment.

10. The electronic device of claim 8, wherein to determine the likelihood of the specified object being in each of the candidate rooms and the likelihood of the specified object being within the threshold distance of each of the candidate objects using the pre-trained large language model, the at least one processor is configured to:

input the natural language query comprising the specified object and each of the candidate rooms to the pre-trained large language model; and obtain a response from the pre-trained large language model, the response comprising a likelihood score for each of the candidate rooms.

11. The electronic device of claim 8, wherein to cause the robot to move to the next location based on the determined likelihoods and the semantic map of the surrounding environment, the at least one processor is configured to use a probabilistic soft logic algorithm and one or more of the determined likelihoods to select a frontier among multiple frontiers identified in the semantic map.

12. The electronic device of claim 8, wherein to cause the robot to move to the next location, the at least one processor is configured to cause the robot to move to an unexplored location within a threshold distance of a first predicted object of the one or more predicted objects if the likelihood of the first predicted object being within the threshold distance of the specified object is greater than a threshold.

13. The electronic device of claim 12, wherein to cause the robot to move to the next location, the at least one processor is further configured to cause the robot to not move to the unexplored location within the threshold distance of the first predicted object if the likelihood of the first predicted object being within the threshold distance of the specified object is less than the threshold.

14. The electronic device of claim 8, wherein to cause the robot to move to the next location, the at least one processor is configured to cause the robot to move to an unexplored location in or within a threshold distance of a first predicted room of the one or more predicted rooms if the likelihood of the specified object being in or within the threshold distance of the first predicted room is greater than a threshold.

15. A non-transitory machine-readable medium containing instructions that when executed cause at least one processor of an electronic device to:

determine a specified object to locate within a surrounding environment, the surrounding environment comprising multiple candidate rooms and multiple candidate objects;

cause a robot to capture an image and a depth map of the surrounding environment;

using a scene understanding model, predict one or more rooms and one or more objects captured in the image;

update a semantic map of the surrounding environment based on the one or more predicted rooms, the one or more predicted objects, the depth map, and a location of the robot;

determine a likelihood of the specified object being in each of the candidate rooms and a likelihood of the specified object being within a threshold distance of each of the candidate objects using a pre-trained large language model, wherein the pre-trained large language model receives as an input a natural language query comprising the specified object and each of the candidate rooms to the pre-trained large language model, and wherein the pre-trained large language model provides the determined likelihoods based on known associations between the specified object, the candidate rooms, and the candidate objects; and cause the robot to move to a next location for the robot to search for the specified object, based on the determined likelihoods and the semantic map of the surrounding environment.

16. The non-transitory machine-readable medium of claim 15, wherein the instructions to determine the specified object to locate within the surrounding environment, comprise instructions to receive a request from a user to locate the specified object within the surrounding environment.

17. The non-transitory machine-readable medium of claim 15, wherein the instructions to determine the likelihood of the specified object being in each of the candidate rooms and the likelihood of the specified object being within the threshold distance of each of the candidate objects using the pre-trained large language model, comprise instructions to:

input the natural language query comprising the specified object and each of the candidate rooms to the pre-trained large language model; and obtain a response from the pre-trained large language model, the response comprising a likelihood score for each of the candidate rooms.

18. The non-transitory machine-readable medium of claim 15, wherein the instructions to cause the robot to move to the next location based on the determined likelihoods and the semantic map of the surrounding environment, comprise instructions to use a probabilistic soft logic algorithm and one or more of the determined likelihoods to select a frontier among multiple frontiers identified in the semantic map.

19. The non-transitory machine-readable medium of claim 15, wherein the instructions to cause the robot to move to the next location, comprise instructions to cause the robot to move to an unexplored location within a threshold distance of a first predicted object of the one or more predicted objects if the likelihood of the first predicted object being within the threshold distance of the specified object is greater than a threshold.

20. The non-transitory machine-readable medium of claim 19, wherein the instructions to cause the robot to move to the next location, further comprise instructions to cause the robot to not move to the unexplored location within the threshold distance of the first predicted object if the likelihood of the first predicted object being within the threshold distance of the specified object is less than the threshold.

* * * * *